P. E. PAULSON.
SPEED ALARM FOR AUTOVEHICLES.
APPLICATION FILED APR. 20, 1915.
1,263,280.
Patented Apr. 16, 1918.
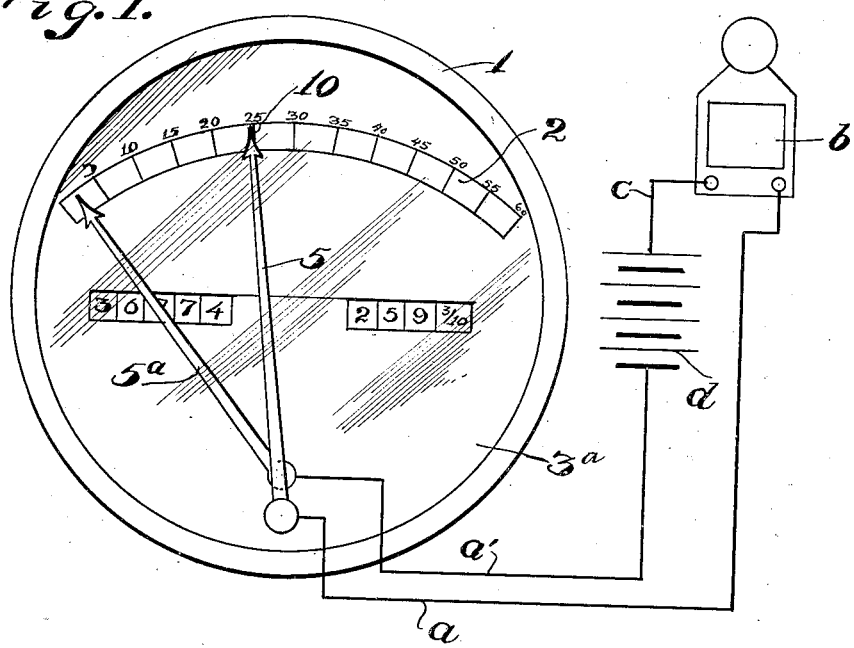
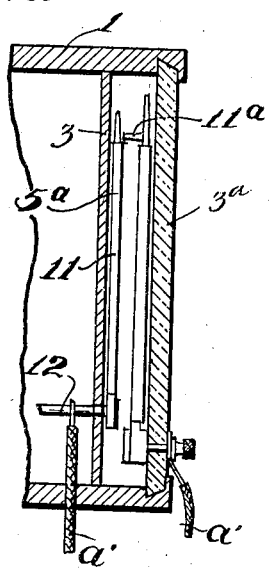
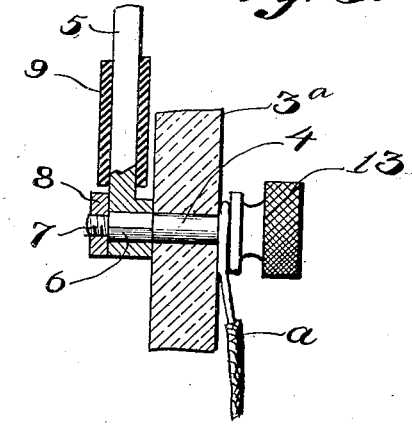
Inventor
P. E. Paulson.

UNITED STATES PATENT OFFICE.

PETER E. PAULSON, OF EASTEDGE, NORTH DAKOTA.

SPEED-ALARM FOR AUTOVEHICLES.

1,263,280.  Specification of Letters Patent.  Patented Apr. 16, 1918.

Application filed April 20, 1915. Serial No. 22,646.

*To all whom it may concern:*

Be it known that I, PETER E. PAULSON, a citizen of the United States, residing at Eastedge, in the county of Baines and State of North Dakota, have invented certain new and useful Improvements in Speed-Alarms for Autovehicles; and I do hereby declare the following to be a full, clear, and exact description of the invention, such as will enable others skilled in the art to which it appertains to make and use the same.

This invention relates to speed alarms for auto vehicles, and the principal object of the invention is to provide simple and efficient means for sounding a bell or giving an alarm when the speed limit is exceeded as indicated upon the speedometer.

The foregoing and other objects may be attained by means of the construction illustrated in the accompanying drawing, in which—

Figure 1 is a front elevation of a speedometer provided with a speed alarm made in accordance with this invention, Fig. 2 is a vertical sectional view of the same, and Fig. 3 is a detail sectional view of the journal member for the pointer.

Referring to the drawing, the numeral 1 indicates a speedometer casing, and 2 is a scale of miles indicated upon the dial 3. The speedometer may be of the usual or any suitable type and pivoted upon a journal member 4 mounted in an opening in the glass panel 3ª of the speedometer, is a pointer 5. The pointer 5 is connected to a squared portion 6 of the journal member 4, and the inner end of the member is provided with a threaded portion 7 to receive a nut 8. The pointer 5 is covered with an insulating sleeve 9 which terminates short of the point 10, said point forming a contact element. Extending at right angles to the pointer 5 is a contact lug 11. The pointer 5 is designed to be set on the scale 2 to any desired speed limit. The speedometer operating hand 5ª is covered with an insulating sleeve 11, said hand being pivoted upon a pin 12, said pin being rotated by the speedometer mechanism. A conductor $a$ is connected to the journal member 4, which is provided with a milled head 13, said conductor leading to a bell $b$, and by conductor $c$ to a battery $d$. A conductor $a'$ leads from the pin 12 of the hand 5ª to the battery $d$.

From the foregoing it will be obvious that when the pointer 5 is set to any desired speed on the scale 2, when the speed of the auto vehicle is sufficient to bring the hand 5ª up until the exposed point of the hand contacts with the lug 11, the circuit will be completed and the bell $b$ will ring, thus giving an alarm to the driver of the vehicle that he is exceeding the speed limit. Should the operator fail to reduce the speed of the vehicle after the bell circuit has been closed by the movement of the indicating hand 5ª into engagement with the contact lug 11ª, and should the speed of the car be on the increase, a further movement of the indicating hand 5ª will also move the pointer 5 owing to the engagement of the indicating hand with the contact lug. After the vehicle has been stopped or the speed reduced, the pointer 5 will remain in the position to which it was moved by the indicating hand 5ª and indicate the speed of the car in excess of the speed for which the pointer 5 was set to indicate. The pointer 5 may be readily reset through the medium of the head 13.

Various changes may be made in the details of construction without departing from the spirit and scope of the invention as defined in the claim.

What is claimed is:—

The combination with a speedometer having a dial, an indicating hand coöperating with the dial, and a glass panel, of a journal member in the panel provided with an operating head, a pointer secured at one end to the journal member, a contact lug carried by the pointer for engagement by the indicating hand, and a sleeve of insulation mounted on each hand.

In testimony whereof I affix my signature in presence of two witnesses.

PETER E. PAULSON.

Witnesses:
 OTTO H. TEMTE,
 E. A. MICKELSEN.